United States Patent
Park (10) Patent No.: US 8,155,719 B2
(45) Date of Patent: Apr. 10, 2012

(54) KEY INPUT DEVICE FOR A PORTABLE COMMUNICATIONS APPARATUS AND A SLIDING MODULE THEREFOR

(75) Inventor: Sang-Joon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 833 days.

(21) Appl. No.: 11/852,756

(22) Filed: Sep. 10, 2007

(65) Prior Publication Data

US 2008/0039157 A1   Feb. 14, 2008

(30) Foreign Application Priority Data

Sep. 8, 2006 (KR) .................. 10-2006-0086804

(51) Int. Cl.
*H04M 1/00* (2006.01)

(52) U.S. Cl. ............... 455/575.4; 455/550.1; 455/575.1; 379/433.12; 379/433.13

(58) Field of Classification Search ............... 455/550.1, 455/575.1, 575.4; 379/433.12, 433.13
See application file for complete search history.

(56) References Cited

U.S. PATENT DOCUMENTS

| | | | | |
|---|---|---|---|---|
| 6,782,281 | B1 * | 8/2004 | Nagasawa .................. | 455/575.3 |
| D549,205 | S  * | 8/2007 | Cho ...................... | D14/138 AD |
| 7,636,591 | B2 * | 12/2009 | Kim et al. .................. | 455/575.4 |
| 7,671,836 | B2 * | 3/2010 | Lehtonen ...................... | 345/156 |
| 7,720,446 | B2 * | 5/2010 | Vanska et al. ................ | 455/90.3 |
| 2005/0064917 | A1 * | 3/2005 | Peng et al. .................. | 455/575.1 |
| 2005/0245251 | A1 * | 11/2005 | Lee et al. .................... | 455/422.1 |
| 2005/0255897 | A1 * | 11/2005 | Lee et al. .................... | 455/575.4 |
| 2006/0046796 | A1 * | 3/2006 | Park et al. .................. | 455/575.4 |
| 2007/0049356 | A1 * | 3/2007 | Jung et al. .................. | 455/575.1 |
| 2007/0082545 | A1 * | 4/2007 | Lee ............................. | 439/567 |
| 2007/0082718 | A1 * | 4/2007 | Yoon et al. .................. | 455/575.4 |
| 2007/0142101 | A1 * | 6/2007 | Seshagiri et al. .......... | 455/575.4 |
| 2007/0254730 | A1 * | 11/2007 | Kim et al. .................. | 455/575.4 |

FOREIGN PATENT DOCUMENTS

| | | |
|---|---|---|
| EP | 1 592 209 | 11/2005 |
| EP | 1 594 289 | 11/2005 |
| EP | 1 631 043 | 3/2006 |
| KR | 1020050105895 | 11/2005 |
| KR | 100606466 | * 4/2006 |
| KR | 1020060031097 | 4/2006 |
| KR | 1020060049059 | 5/2006 |
| KR | 100606466 | 7/2006 |
| KR | 2007/00544333 | * 5/2007 |
| KR | 1020070054433 | 5/2007 |
| WO | WO 2006041238 A1 * | 4/2006 |

* cited by examiner

*Primary Examiner* — Junpeng Chen
(74) *Attorney, Agent, or Firm* — The Farrell Law Firm, P.C.

(57) ABSTRACT

A key input device for a portable communications apparatus having a main body housing and a sliding body housing mounted on the main body housing to be slid along first and second directions perpendicular to each other. The key input device includes a first key array arranged on the main body housing to be exposed or covered by the sliding motion of the sliding body housing along the first direction, a second key array arranged on the main body housing to be exposed or covered by the sliding motion of the sliding body housing along the second direction, and a third key array arranged on the main body housing to be exposed or covered by the sliding motion of the sliding body housing along either the first or the second direction, wherein the first, second and third key arrays are all exposed or covered when the sliding body housing is slid first along the first direction and then along the second direction, or first along the second direction and then along the first direction.

12 Claims, 12 Drawing Sheets

KEY INPUT DEVICE FOR A PORTABLE COMMUNICATIONS APPARATUS AND A SLIDING MODULE THEREFOR

PRIORITY

This application claims priority under 35 U.S.C. §119 to an application filed in the Korean Intellectual Property Office on Sep. 8, 2006 and assigned Serial No. 2006-86804, the contents of which are incorporated herein by reference.

BACKGROUND OF THE INVENTION

1. Field of the Invention

The present invention relates to a portable communications apparatus, such as a cellular phone, a PDA (Personal Digital Assistant) an HHP (Hand-Holding Phone), etc., and more particularly to a key input device for a portable communication apparatus that includes a main body housing and a sliding body housing mounted on the main body to be slid thereon, and a sliding module therefor.

2. Description of the Related Art

Portable communications apparatuses are commonly represented by a mobile communications terminal providing people with wireless communication services of various content, such as voice communication, short message exchange, mobile banking, TV (Television) broadcasting, on-line games, video on demand, etc.

Mobile communications terminals are generally classified according to their external forms into a bar-type with a single housing containing a communications circuit and input and output devices, such as a transmitting part and a receiving part, a flip-type with a flip cover attached to a bar-type, and a folder-type with input and output devices respectively arranged in a pair of housings capable of being folded or spread to or from each other. In addition, a sliding-type terminal has been recently introduced in order to meet various desires and needs of the user together with enhanced convenience.

Mobile communications services have been developed to provide multimedia services enabling transmission of game, music and video files, and on-line games in addition to original voice communication and short message exchange. Such varieties of mobile communications contents have caused design development of mobile communications terminals to enhance input/output devices for meeting them. However, limitations of allowable mounting space in a mobile communications terminal makes it difficult to extend the input/output devices beyond their original basic functions. For example, a sliding-type mobile communications terminal presently available in the market is designed to enable the sliding body housing to be slid along a single direction relative to the main body housing by about half the length of the main body housing, thus restricting spaces for mounting input keys and an LCD (Liquid Crystal Display) therein.

SUMMARY OF THE INVENTION

It is an aspect of the present invention to provide a key input device for a sliding-type portable communications apparatus extended to meet varieties of the mobile communications services.

It is another aspect of the present invention to provide a key input device for a sliding-type portable communications apparatus extended to have additional keys and to secure a comparatively large LCD screen by means of the sliding body housing to be slid along multiple directions.

It is still another aspect of the present invention to provide a sliding module for a sliding-type portable communications apparatus, that is formed integrally with the housings of the communications apparatus to slim the thickness thereof.

According to an aspect of the present invention, a key input device is provided for a portable communications apparatus having main body housing and a sliding body housing mounted on the main body housing to be slid along first and second directions perpendicular to each other, the key input device including a first key array arranged on the main body housing to be exposed or covered by the sliding motion of the sliding body housing along the first direction, a second key array arranged on the main body housing to be exposed or covered by the sliding motion of the sliding body housing along the second direction, and a third key array arranged on the main body housing to be exposed or covered by the sliding motion of the sliding body housing along either the first or the second direction, wherein the first, second and third key arrays are all exposed or covered when the sliding body housing is slid first along the first direction and then along the second direction, or first along the second direction and then along the first direction.

According to another aspect of the present invention, a sliding module is provided for a portable communications apparatus with a main body housing, the sliding module including a sliding body housing mounted on the main body housing to be slid along first and second directions perpendicular to each other, a first key array arranged on the main body housing to be exposed or covered by the sliding motion of the sliding body housing along the first direction, a second key array arranged on the main body housing to be exposed or covered by the sliding motion of the sliding body housing along the second direction, and a third key array arranged on the main body housing to be exposed or covered by the sliding motion of the sliding body housing along either the first or the second direction, which sliding module comprises a base member, a first sliding member mounted on the base member for enabling the sliding body housing to be slid along the first direction relative to the main body housing, a second sliding member attached integrally with the sliding body housing for enabling the sliding body housing to be slid along the second direction relative to the main body housing, and a resilient means mounted between the members for providing resilient forces to enable the first and second sliding members to be slid.

BRIEF DESCRIPTION OF THE DRAWINGS

The above and other aspects, features and advantages of the present invention will become more apparent from the following detailed description when taken in conjunction with the accompanying drawing in which.

DETAILED DESCRIPTION OF THE PREFERRED EMBODIMENTS

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

Figure 1:
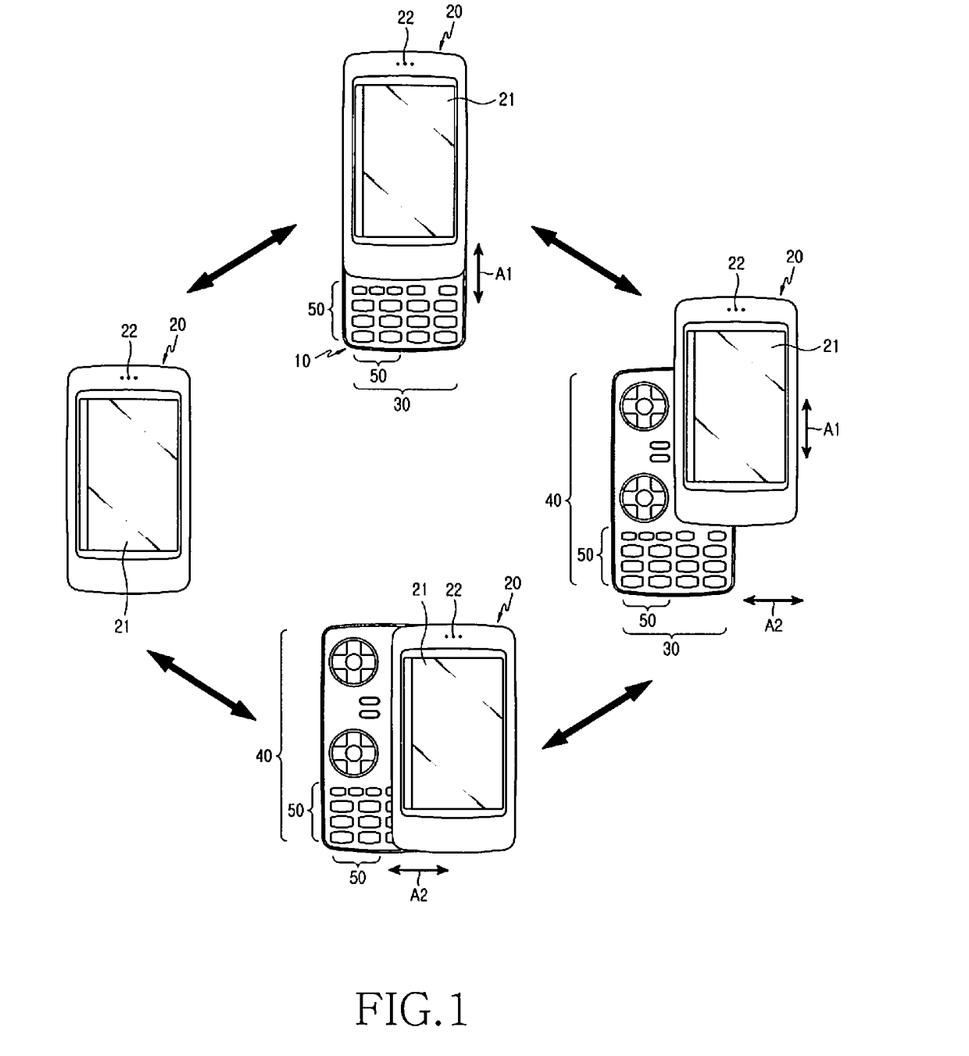
FIG. 1 shows plane views for illustrating various operational aspects of the key input device of a portable communications apparatus according to a first embodiment of the present invention.

Referring to FIG. 1, one example of a key input device according to the present invention is provided for a portable communications apparatus having a main body housing 10 and a sliding body housing 20 mounted on the main body housing 10 to be slid along first and second directions A1 and A2 perpendicular to each other, and includes a first, a second and a third key array 30, 40 and 50 each including a plurality of keys. The first key array 30 is arranged on the main body housing 10 to be exposed or covered by the sliding motion of the sliding body housing 20 along the first direction A1, the second key array 40 arranged on the main body housing 10 to be exposed or covered by the sliding motion of the sliding body housing 20 along the second direction A2, and the third key array 50 arranged on the main body housing 10 to be exposed or covered by the sliding motion of the sliding body housing 20 along either the first or the second direction A1 or A2.

As shown in FIG. 1, the third key array 50 is designed to constitute a part of both the first and the second key array 30 and 40 to serve as keys for characters, numbers or game commands according to the sliding direction of the sliding body housing 20. The first and third key arrays 30 and 50 have 3×4 keys arrangement. The second key array 40 is designed to serve as game command keys or navigation keys according to the use thereof. The sliding body housing 20 is provided with a comparatively large LCD panel 21 and a speaker device 22.

The operation of the key input device is described in connection with FIG. 1. When using the portable communications terminal for voice communication mode, the sliding body housing 20 is initially slid along the first direction A1 relative to the main body housing 10, so the first and third key arrays 30 and 50 are exposed. The first and third key arrays 30 and 50 have 3×4 keys arrangement, through which the user may input characters and numbers in the voice communication mode. By subsequently sliding the sliding body housing 20 in the voice communication mode along the second direction A2 relative to the main body housing 10, the second key array 40 is exposed to enable the terminal to perform an additional function such as game playing. In this case, the sliding body housing 20 is positioned diagonally with reference to the main body housing 10 to expose all of the first, second and third key arrays 30, 40 and 50. Hence, the user may use the second key array 40 exclusively for the game keys.

Alternatively, by initially sliding the sliding body housing 20 along the second direction A2 relative to the main body housing 10 from the position of the sliding body housing 20 completely covering the main body housing 10, the second and third key arrays 40 and 50 are exposed to enable the terminal to be used for the game mode. By subsequently sliding the sliding body housing 20 along the first direction A1 relative to the main body housing 10, all of the first, second and third key arrays 30, 40 and 50 are exposed to enable the user to input characters and numbers. Consequently, the sliding body housing 20 is positioned diagonally with reference to the main body housing 10.

The third key array 50 is shared commonly by the first and the second key array, and always exposed when the sliding body housing 20 is slid along either the first direction A1 or the second direction A2 from the position of the sliding body housing 20 completely covering the main body housing 10. As described above, the sliding housing 20 may be slid first along the first direction A1 and then along the second direction, or vice versa, thus enhancing the usability of the terminal for different operation modes.

Figure 11:
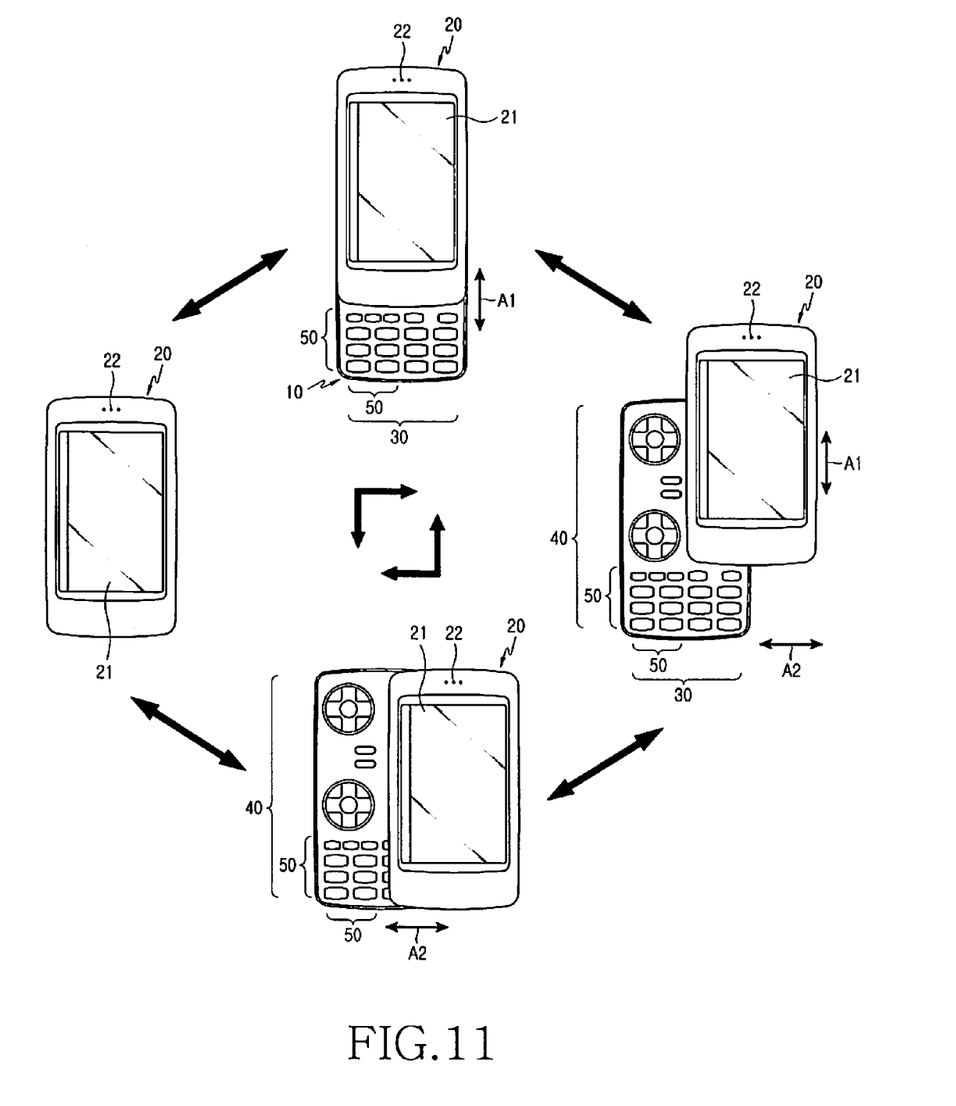
FIG. 11 shows plane views for illustrating a procedure of exposing and covering the key input device of a portable communications apparatus according to the first embodiment of the present invention.

FIG. 11 shows a procedure of exposing and covering the key input device, where the sliding body housing 20 is initially slid forward along the first direction A1 relative to the main body housing 10 to expose the first and third key arrays 30 and 50. By subsequently sliding the sliding body housing 20 forward along the second direction A2, all of the first, second and third key arrays 30, 40 and 50 are exposed. From this state, by sliding the sliding body housing 20 backward along the first direction A1, the first key array 30 is covered, but the second and third key arrays 40 and 50 remain exposed. By sliding the sliding body housing 20 backward along the second direction A2, the sliding body housing 20 returns to the original position to completely cover the main body housing 10. Thus, the sliding body housing 20 may traverse 360 degrees through the sliding movements forward and backward along the first and second directions relative to the main body housing 10.

Figure 12:
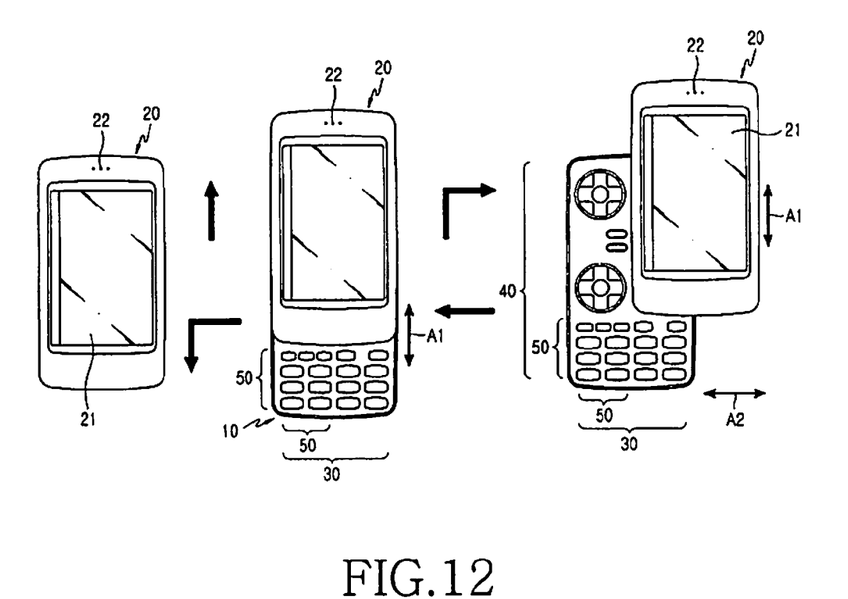
FIG. 12 shows plane views for illustrating another procedure of exposing and covering the key input device of a portable communications apparatus according to the first embodiment of the present invention.

FIG. 12 shows another procedure of exposing and covering the key input device, where the sliding body housing 20 is initially slid forward along the first direction A1 relative to the main body housing 10 to expose the first and third key arrays 30 and 50. By subsequently sliding the sliding body housing 20 forward along the second direction A2, all of the first, second and third key arrays 30, 40 and 50 are exposed. From this state, by sliding the sliding body housing 20 backward along the second direction A2, the second key array 40 is covered, but the first and third key arrays 30 and 50 remain exposed. Then sliding the sliding body housing 20 backward along the first direction A1, the first and third key arrays 30 and 50 are covered.

Figure 13:
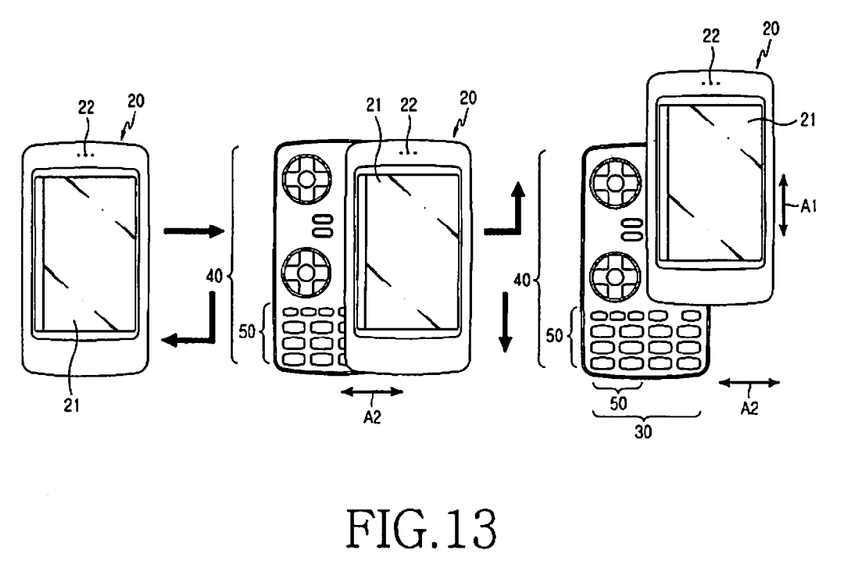
FIG. 13 shows plane views for illustrating a further procedure of exposing and covering the key input device of a portable communications apparatus according to the first embodiment of the present invention.

FIG. 13 shows another procedure of exposing and covering the key input device, where the sliding body housing 20 is initially slid forward along the second direction A2 relative to the main body housing 10 to expose the second and third key arrays 40 and 50. By subsequently sliding the sliding body housing 20 forward along the first direction A1, all of the first, second and third key arrays 30, 40 and 50 are exposed. From this state, by sliding the sliding body housing 20 backward along the first direction A1, the first key array 30 is covered, but the second and third key arrays 40 and 50 remain exposed. Then sliding the sliding body housing 20 backward along the second direction A2, the second and third key arrays 40 and 50 are covered.

As described above, because the third key array 50 forms a part of both the first and the second key array 30 and 40, it is exposed or covered along with the first and the second key array 30 and 40 according to the sliding movement of the sliding body housing 20.

Hereinafter in connection with FIGS. 2 to 10 will be described the structure and operation of the sliding module for the portable communications apparatus according to another example of the present invention.

Figure 2:
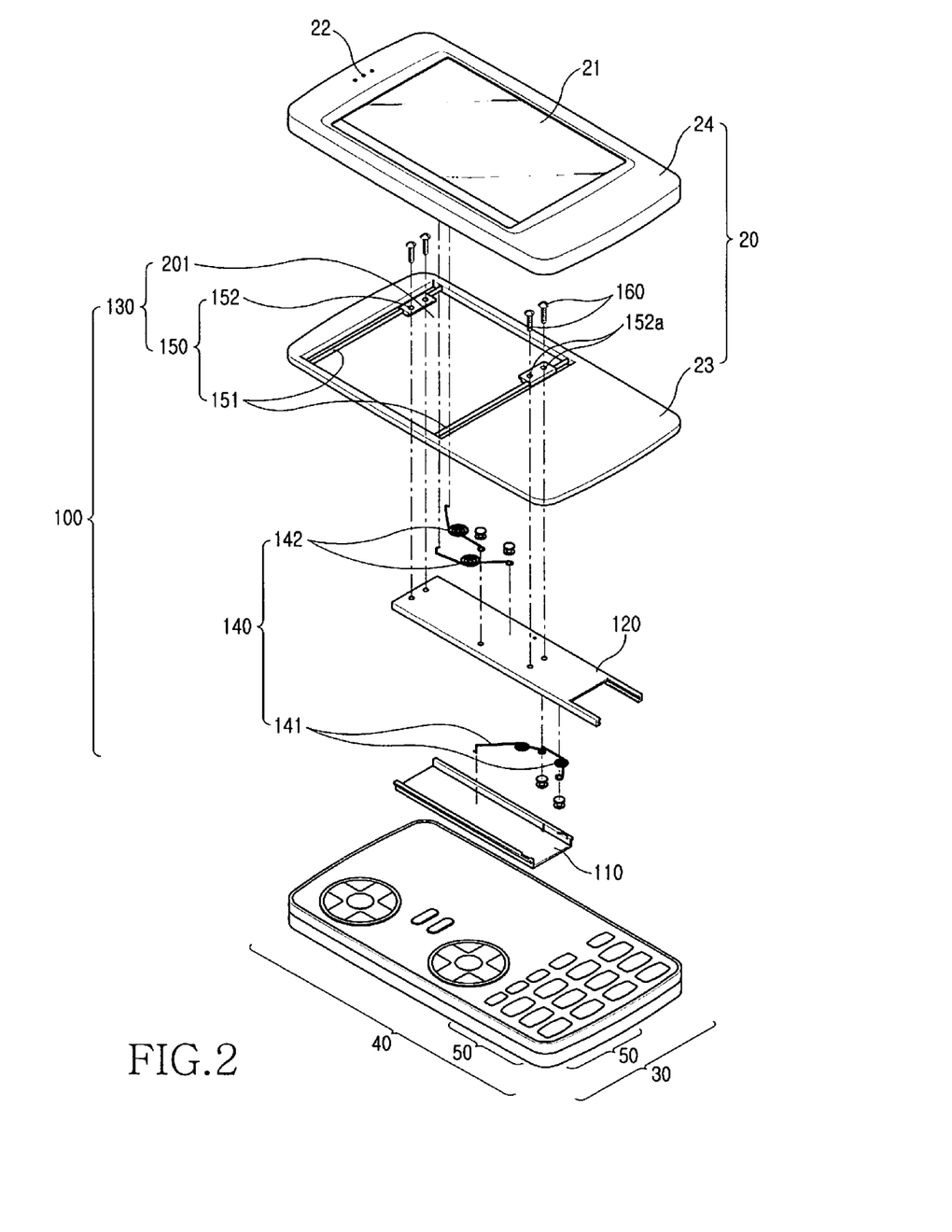
FIG. 2 is an exploded perspective view of a sliding module for a portable communications apparatus according to a second embodiment of the present invention.

Referring to FIG. 2, the sliding module 100 for the portable communications apparatus includes a base member 110, a first and a second sliding member 120 and 130, and a resilient device 140. The first sliding member 120 is mounted on the base member 110 to enable the sliding body housing 20 to be slid along the first direction A1 relative to the main body housing 10. The second sliding member 130 is integrally attached to a mounting hole 201 formed in the sliding body housing, and mounted on the first sliding member 120 to enable the sliding body housing 20 to be slid along the second direction A2 relative to the main body housing 10. The second sliding member 130 is provided with a guide device 150 for enabling the sliding body housing 20 to be slid along the second direction A2 relative to the main body housing 10. The guide device 150 includes at least one guide rod 151 and at least one guide member 152. The guide rod 151 is fixedly mounted in the mounting hole 201. The guide member 152 has a guide hole to slidably guide the guide rod 151, fastened to the top of the first sliding member 120 by means of screws.

Figure 4:
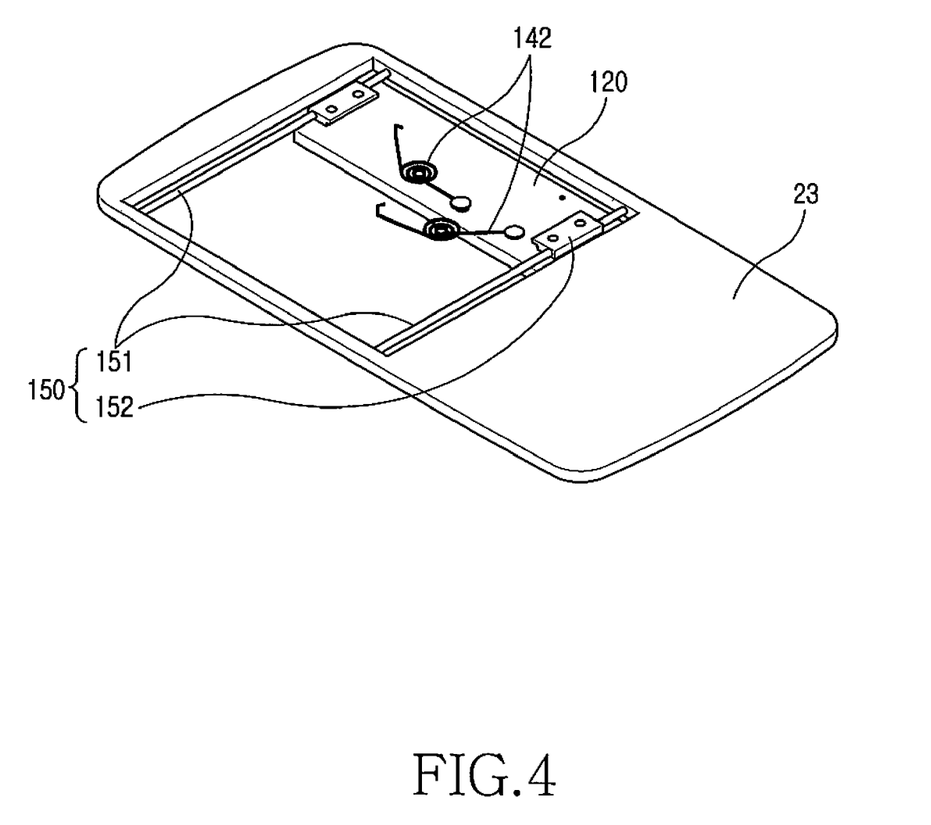
FIG. 4 is a perspective view for illustrating the assembled state of the sliding module according to the second embodiment of the present invention.

As shown in FIGS. 2 and 4, the guide member 152 is provided with at least one screw hole 152a through which a screw 160 is inserted to fasten the guide member 152 receiving the guide rod 151 to the top of the first sliding member 120. The sliding body housing 20 includes an upper housing part 24 and a lower housing part 23 formed with the mounting hole 201. Between the first and second sliding members 120 and 130 and the base member 110 is provided a resilient device 140 to provide resilient forces for enabling the first and second sliding members 120 and 130 to be slid.

Figure 5:
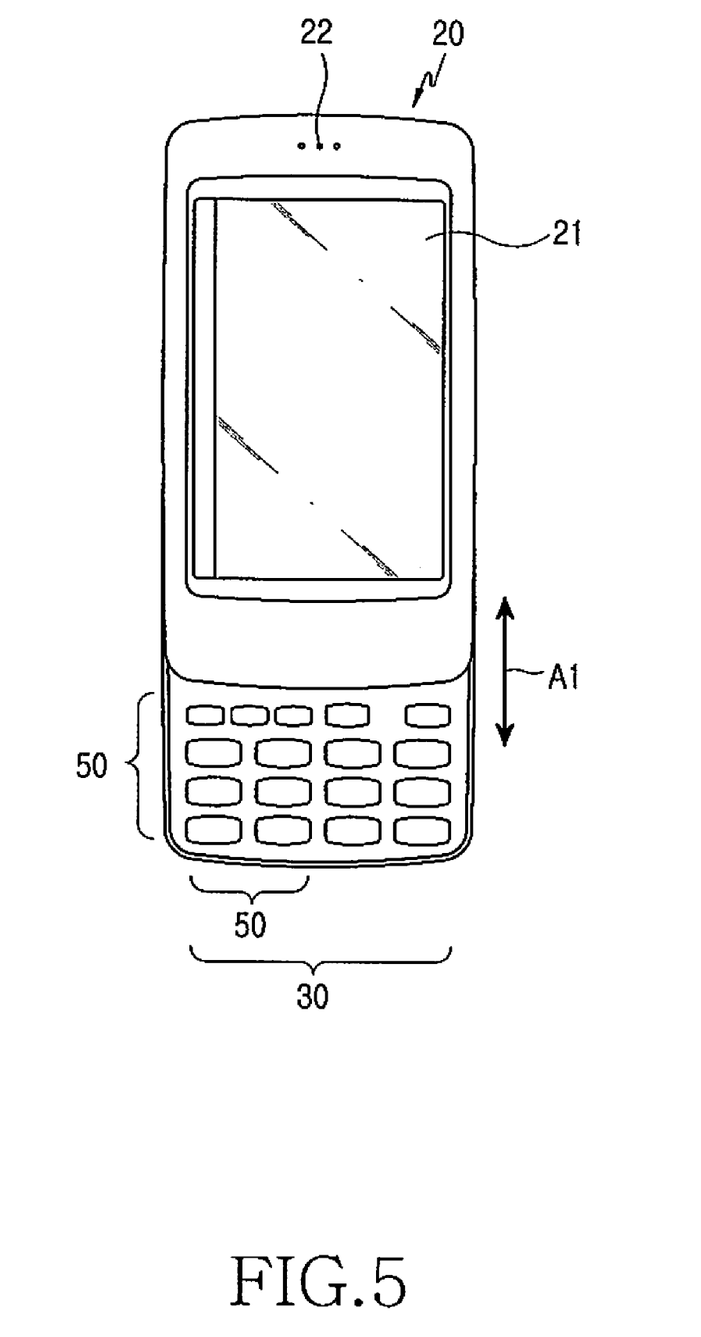
FIG. 5 is a plane view for illustrating the sliding body housing slid along the first direction relative to the portable communications apparatus by operating the sliding module according to the second embodiment of the present invention.
Figure 6:
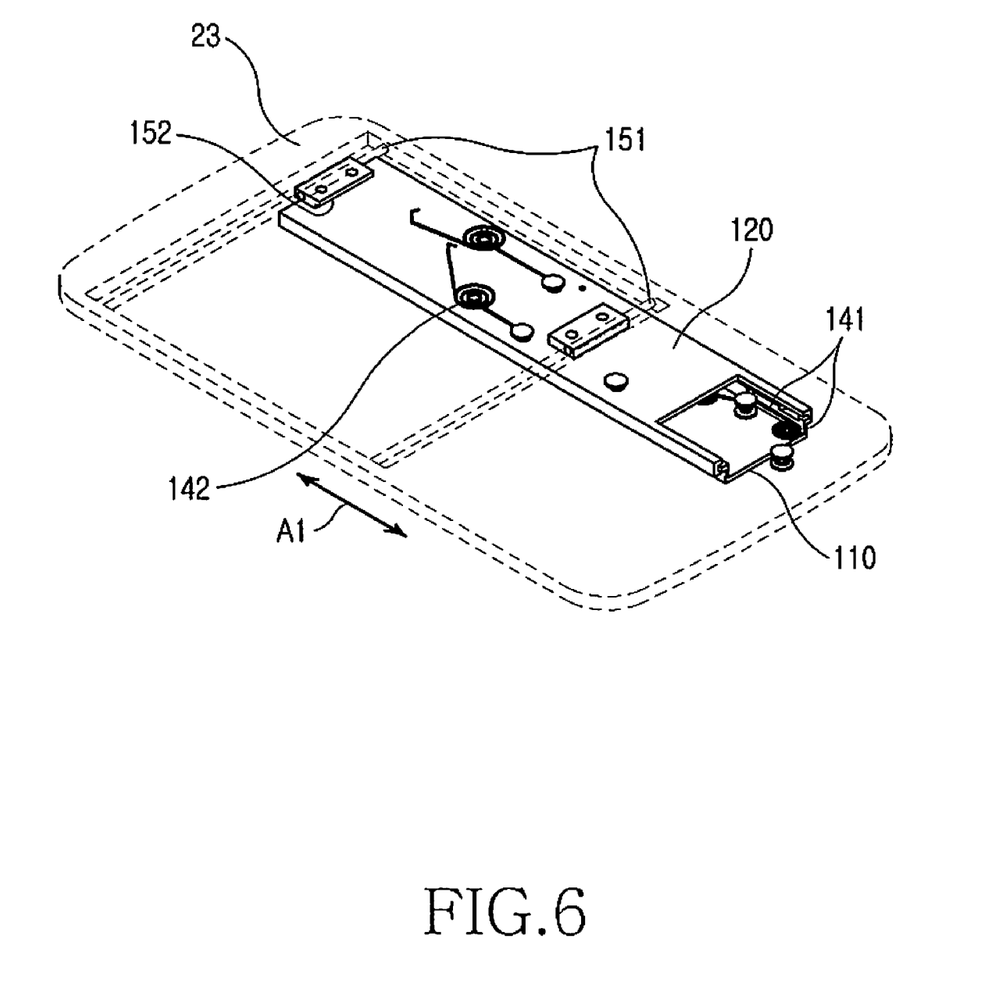
FIG. 6 is a perspective view for illustrating the structural aspect of the sliding module according to the second embodiment of the present invention with the sliding body housing slid along the first direction relative to the portable communications apparatus.

In operation, as shown in FIGS. 3 to 6, when the sliding body housing 20 is slid along the first direction A1, the first and third key arrays arranged in the main body housing 10 are all exposed. Namely, sliding the sliding body housing 20 along the first direction A1, both of the first and second sliding members 120 and 130 are displaced as shown in FIG. 5. The resilient device 140 has a first spring member 141 for providing a resilient force to enable the first and second sliding members 120 and 130 to be slid along the first direction A1, as shown in FIG. 6.

Figure 7:
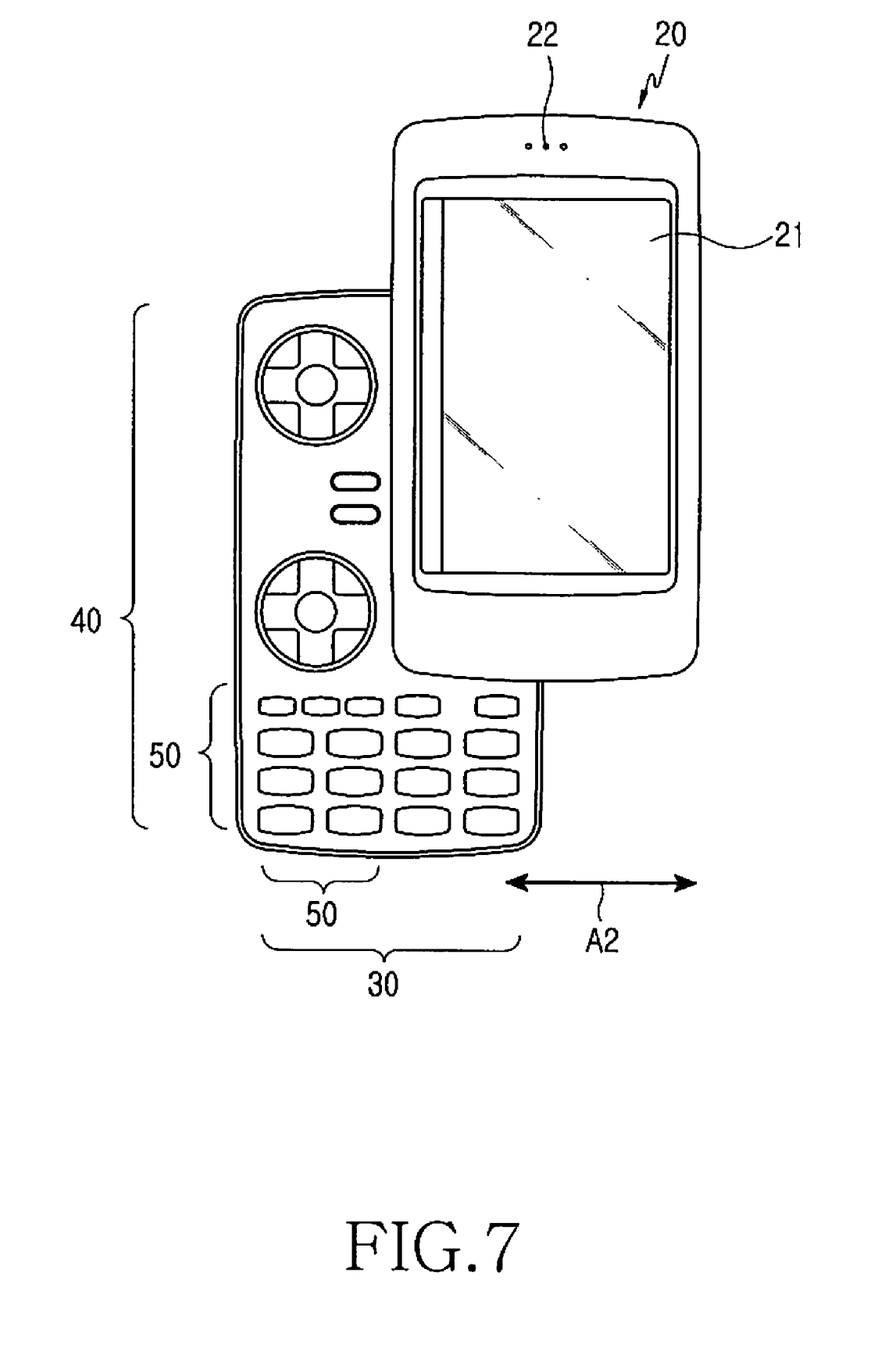
FIG. 7 is a plane view for illustrating the sliding body housing slid along both the first and the second direction relative to the portable communications apparatus by operating the sliding module according to the second embodiment of the present invention.
Figure 8:
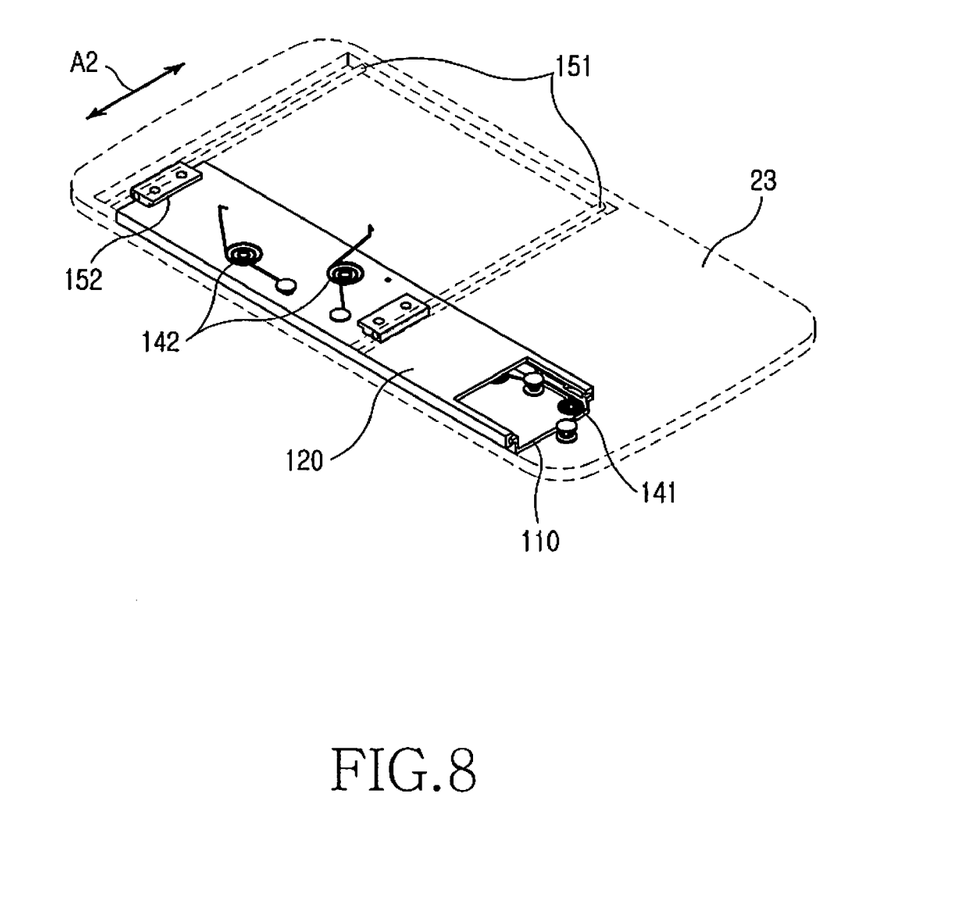
FIG. 8 is a perspective view for illustrating the structural aspect of the sliding module according to the second embodiment of the present invention with the sliding body housing slid along the second direction relative to the portable communications apparatus.

Referring to FIGS. 7 and 8, when the sliding body housing 20 is slid along the second direction A2 from the position of being displaced forward along the first direction A1, the first, second and third key arrays 30, 40 and 50 are all exposed on the main body housing 10. As the sliding body housing 20 is slid forward along the second direction A2, the guide member 152 serves to slidably guide the guide rod 151 toward the position as shown in FIG. 8. The resilient device 140 also has a second spring member 142 for providing a resilient force to enable the sliding body housing 20 to be slid along the second direction A2. From this state, the sliding body housing 20 may be returned by backward sliding.

Figure 3:
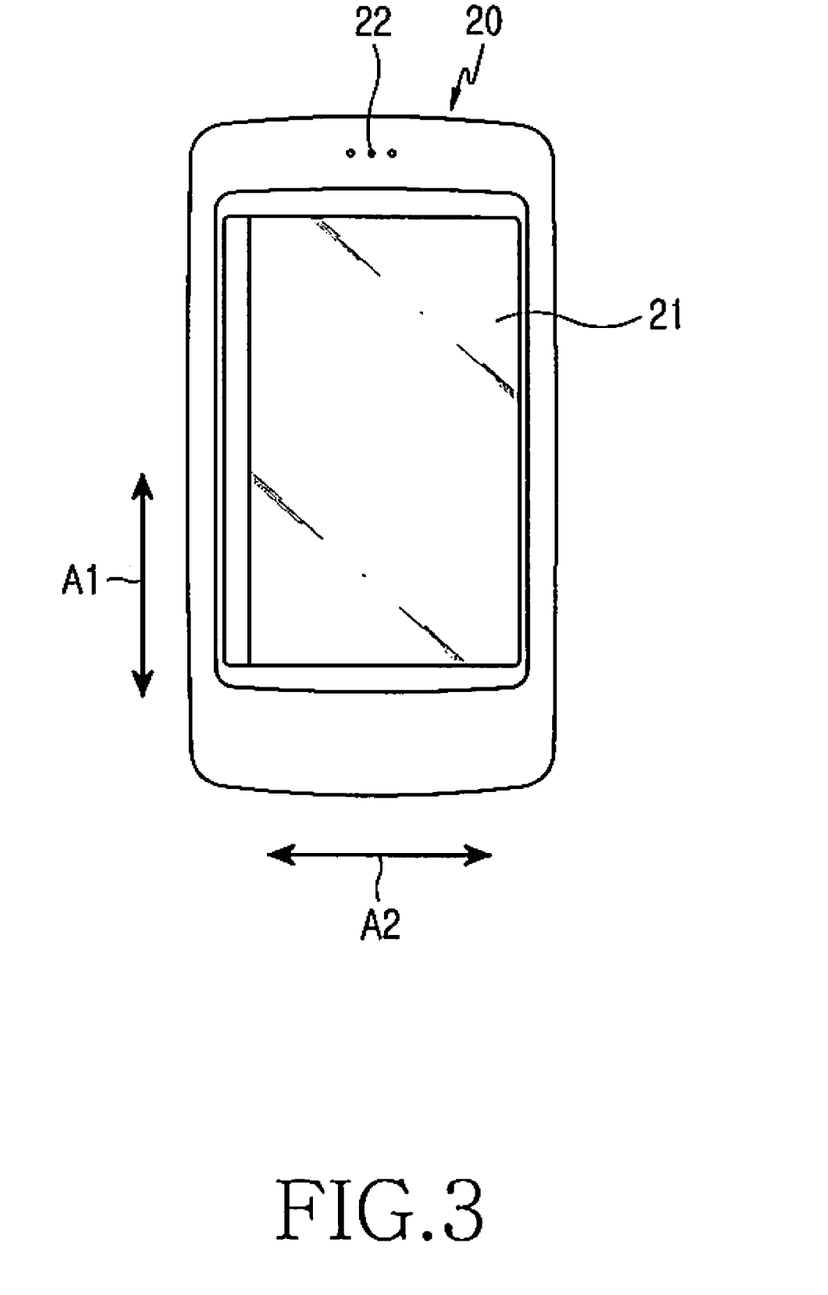
FIG. 3 is a plane view for illustrating a portable communications terminal before sliding the sliding body housing by operating the sliding module according to the second embodiment of the present invention.
Figure 9:
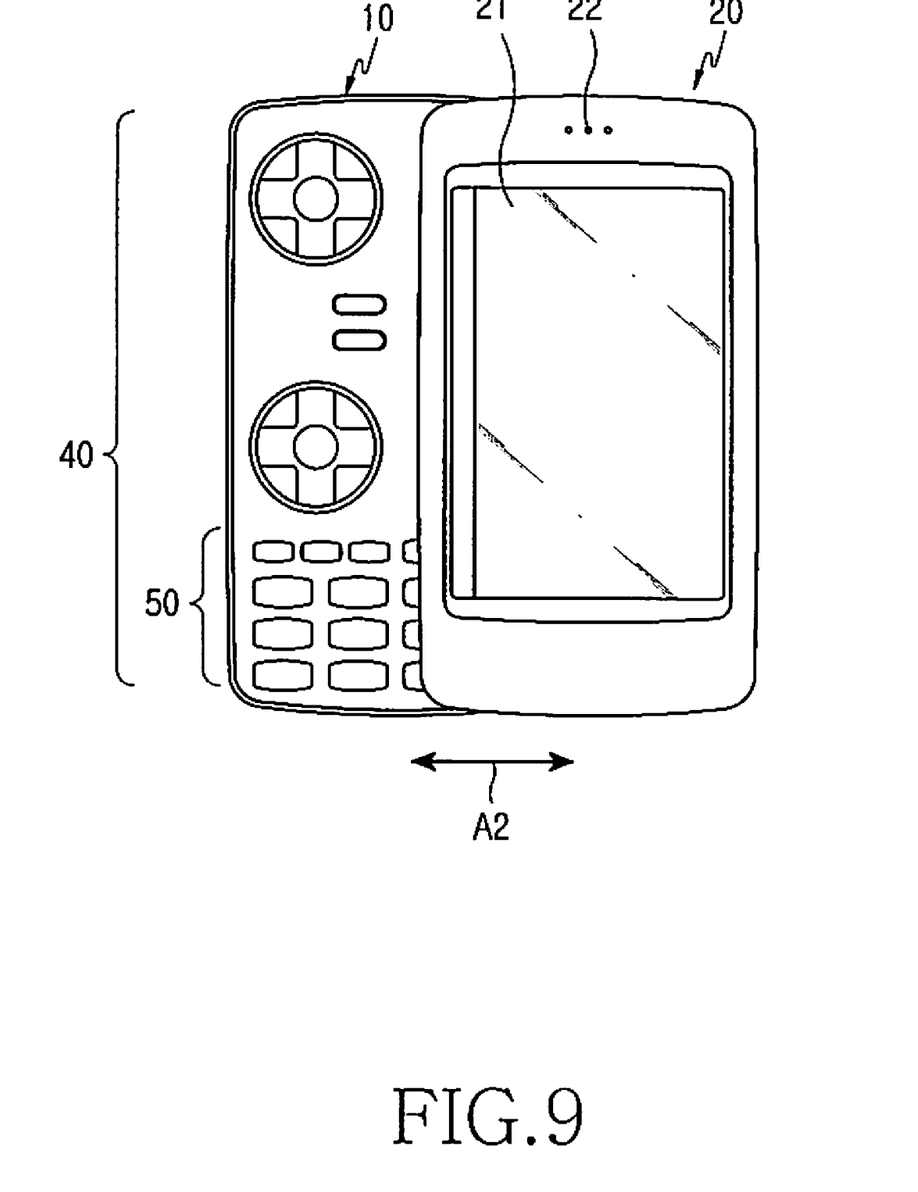
FIG. 9 is a plane view for illustrating the sliding body housing slid along the second direction relative to the portable communications apparatus by operating the sliding module according to the second embodiment of the present invention.
Figure 10:
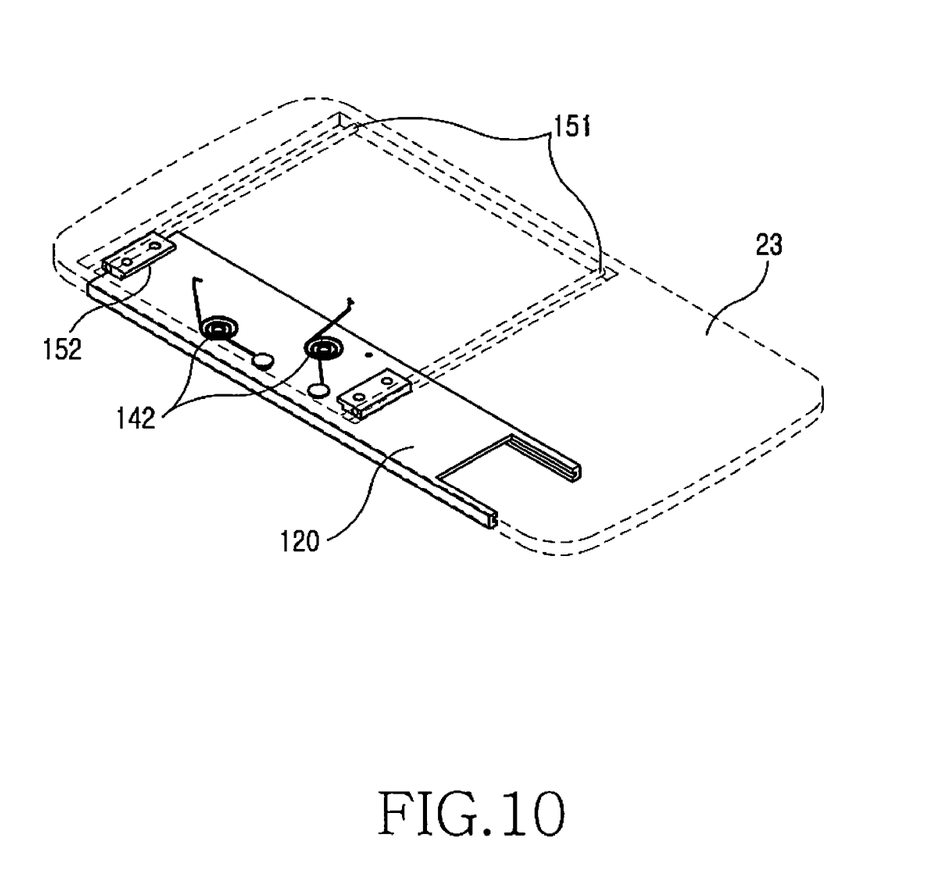
FIG. 10 is a perspective view for illustrating the structural aspect of the sliding module according to the second embodiment of the present invention with the sliding body housing slid along the second direction relative to the portable communications apparatus.

Alternatively, referring to FIGS. 3, 9 and 10, when the sliding body housing 20 is initially slid along the second direction A2 relative the main body housing 10, the second and third key arrays 40 and 50 are exposed. The guide member 152 serves to slidably guide the guide rod 151 toward the position as shown in FIG. 10, and the second spring member 142 of the resilient device 140 provides the resilient force to enable the sliding body housing 20 to be slid along the second direction A2. From this state, by sliding the sliding body housing 20 along the first direction A1 to the position as shown in FIG. 7, the first, second and third key arrays 30, 40 and 50 are all exposed on the main body housing 10. As shown in FIG. 8, the first sliding member 120 and the guide rod 151 and guide member 152 of the second sliding member 130 are all slid along with the sliding body housing 20, and the first spring member 141 of the resilient device 140 provides the resilient force for enabling the first and second sliding members 120 and 130 to be slid along the first direction A1.

Thus, the invention enables the sliding body housing to be slid along both of the first and second directions to expose the first, second and third key arrays on the main body housing, so the communications terminal may secure a comparatively large space for arranging the data input keys, facilitating the user's key operation for inputting characters, numbers, and game playing. Moreover, the sliding members are integrally formed with the sliding body housing, making the thickness of the communications terminal slim.

While the invention has been shown and described with reference to a certain preferred embodiment thereof, it will be understood by those skilled in the art that various changes in form and details may be made therein without departing from the spirit and scope of the invention.

What is claimed is:

1. A portable communications apparatus having a main body housing including a plurality of key arrays, and a sliding body housing mounted on the main body housing to be slid along first and second directions perpendicular to each other, the apparatus allowing all of the plurality of key arrays of the main body housing to be exposed or covered when the sliding body housing is slid first along the first direction and then along the second direction, or first along the second direction and then along the first direction, such that the sliding body housing is positioned diagonally with reference to the main body housing to expose all of the plurality of key arrays, wherein the sliding body housing traverses 360 degrees through the sliding motions both forward and backward along the first and second directions.

2. The portable communications apparatus as defined in claim 1, further comprising:
- a first key array arranged on the main body housing to be exposed or covered by the sliding motion of the sliding body housing along the first direction;
- a second key array arranged on the main body housing to be exposed or covered by the sliding motion of the sliding body housing along the second direction; and
- a third key array arranged on the main body housing to be exposed or covered by the sliding motion of the sliding body housing along either the first or the second direction.

3. The portable communications apparatus as defined in claim 2, wherein the third key array constitutes a part of both the first and the second key array to serve as keys for characters, numbers or game commands according to the sliding direction of the sliding body housing.

4. The portable communications apparatus as defined in claim 2, wherein the first key array has a 3×4 keys arrangement.

5. The portable communications apparatus as defined in claim 2, wherein the second key array serves as one of game command keys and navigation keys.

6. The portable communications apparatus as defined in claim 1, wherein the sliding body housing slides forward and backward along the first and second directions relative to the main body housing.

7. A sliding module for a portable communications apparatus having a main body housing including a plurality of key arrays, and a sliding body housing mounted on the main body housing to be slid along first and second directions perpendicular to each other, wherein the sliding module comprises:
- a base member;
- a first sliding member mounted on the base member for enabling the sliding body housing to be slid along the first direction relative to the main body housing;
- a second sliding member attached integrally with the sliding body housing for enabling the sliding body housing to be slid along the second direction relative to the main body housing; and
- a resilient means mounted between the members for providing resilient forces to enable the first and second sliding members to be slid,
- wherein all of the plurality of key arrays of the main body housing are exposed or covered when the sliding body housing is slid first along the first direction and then along the second direction, or first along the second direction and then along the first direction, such that the sliding body housing is positioned diagonally with reference to the main body housing to expose all of the plurality of key arrays, and
- wherein the sliding body housing traverses 360 degrees through the sliding motions both forward and backward along the first and second directions.

8. A sliding module as defined in claim 7, wherein the sliding body housing is provided with a mounting hole for mounting the second sliding member.

9. A sliding module as defined in claim 7, wherein the second sliding member includes a guide means for enabling the sliding body housing to be slid along the second direction relative to the main body housing.

10. A sliding module as defined in claim 9, wherein the guide means comprises at least one guide rod attached to the sliding body housing, and a guide member fastened to the top of the first sliding member for receiving the guide rod to enable the sliding body housing to be slid along the second direction.

11. A sliding module as defined in claim 10, wherein the guide member is provided with at least one screw fastening portion used for fastening the guide member to the first sliding member.

12. A sliding module as defined in claim 7, wherein the resilient means comprises at least a first spring member provided between the base member and the first sliding member, and a second spring member provided between the first and the second sliding member.

\* \* \* \* \*